(12) United States Patent
Ozeki et al.

(10) Patent No.: US 7,708,471 B2
(45) Date of Patent: May 4, 2010

(54) BI-DIRECTIONAL OPTICAL MODULE

(75) Inventors: Yukihiro Ozeki, Fujisawa (JP); Kazumi Furuta, Akishima (JP)

(73) Assignee: Konica Minolta Holdings, Inc., Tokyo (JP)

(*) Notice: Subject to any disclaimer, the term of this patent is extended or adjusted under 35 U.S.C. 154(b) by 309 days.

(21) Appl. No.: 11/917,317

(22) PCT Filed: Jun. 5, 2006

(86) PCT No.: PCT/JP2006/311196

§ 371 (c)(1), (2), (4) Date: Dec. 12, 2007

(87) PCT Pub. No.: WO2006/134794

PCT Pub. Date: Dec. 21, 2006

(65) Prior Publication Data

US 2009/0232452 A1 Sep. 17, 2009

(30) Foreign Application Priority Data

Jun. 15, 2005 (JP) .............................. 2005-174760

(51) Int. Cl.
*G02B 6/36* (2006.01)
*H04B 10/00* (2006.01)

(52) U.S. Cl. .............................. 385/88; 385/37; 385/92; 398/134; 398/135; 398/136; 398/137; 398/138; 398/139

(58) Field of Classification Search ................... 385/88, 385/92, 37, 33; 398/134–139, 79–87
See application file for complete search history.

(56) References Cited

U.S. PATENT DOCUMENTS

| | | | |
|---|---|---|---|
| 5,543,228 A | 8/1996 | Taniguchi et al. | |
| 5,555,334 A * | 9/1996 | Ohnishi et al. | ................. 385/93 |
| 5,995,285 A | 11/1999 | Unno | |
| 6,033,810 A | 3/2000 | Taniguchi et al. | |
| 6,327,086 B1 | 12/2001 | Unno | |
| 6,504,975 B1 * | 1/2003 | Yamagata et al. | .............. 385/33 |

(Continued)

FOREIGN PATENT DOCUMENTS

JP 6-43387 A 2/1994

(Continued)

*Primary Examiner*—Brian M. Healy
*Assistant Examiner*—Guy G Anderson
(74) *Attorney, Agent, or Firm*—Frishauf, Holtz, Goodman & Chick, P.C.

(57) ABSTRACT

The present invention is provided to obtain an inexpensive bidirectional optical module wherein a diffraction efficiency can be maximized at different diffraction order for light beam with different wavelength, and light usage efficiency is enhanced. The bidirectional optical module includes a light-emitting element for transmitting an optical signal toward an end of an optical fiber; a light-receiving element for receiving an optical signal from the end of the optical fiber; and a grating in which stair shapes are repeated with a predefined pitch. In the bidirectional optical module, a phase function is defined as phase-difference contour lines which is formed by making two light fluxes from predetermined positions interfere with each other on a surface arranged at a position of the grating. A planar pitch of the grating is formed such that values of the phase function form phase contour lines each representing an integer multiple of 360 degrees.

12 Claims, 7 Drawing Sheets

C-C CROSS SECTION

U.S. PATENT DOCUMENTS

| | | | |
|---|---|---|---|
| 6,847,472 B2 * | 1/2005 | Masuda | ............... 359/196.1 |
| 2005/0175295 A1 | 8/2005 | Ozeki et al. | |

FOREIGN PATENT DOCUMENTS

| | | |
|---|---|---|
| JP | 6-308329 A | 11/1994 |
| JP | 10-20107 A | 1/1998 |
| JP | 2003-344715 A | 12/2003 |
| JP | 2004-181987 A | 7/2005 |
| JP | 2006-72232 A | 3/2006 |

* cited by examiner

FIG. 1
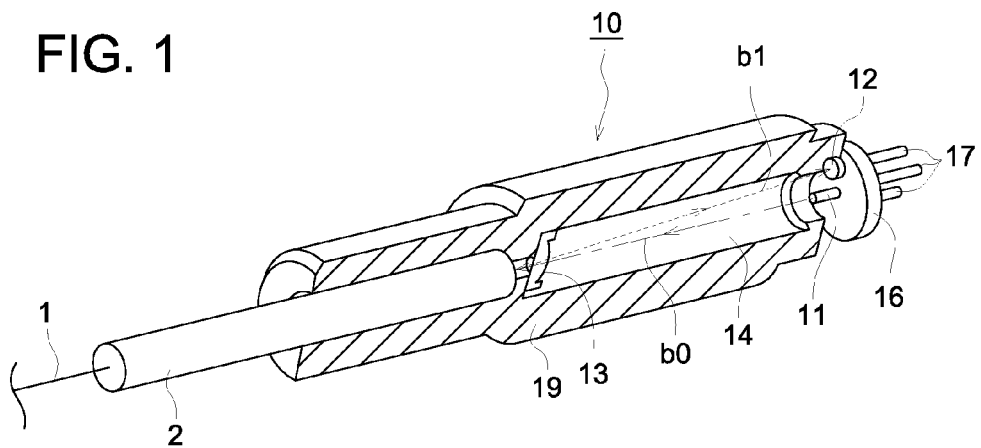
FIG. 2
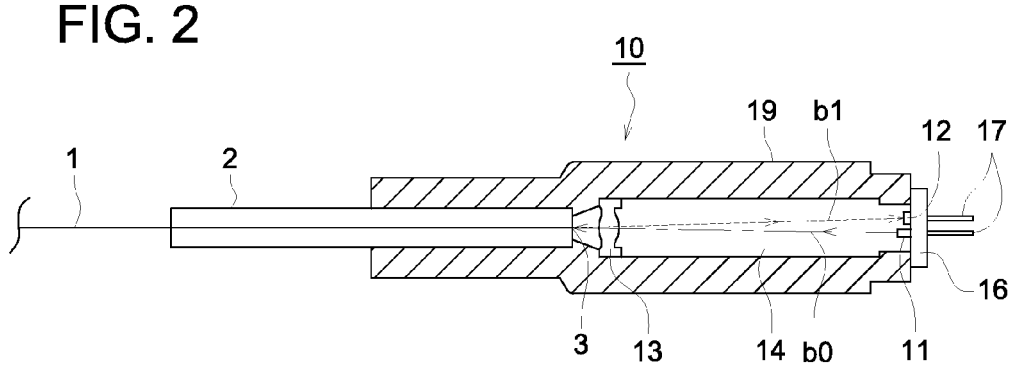
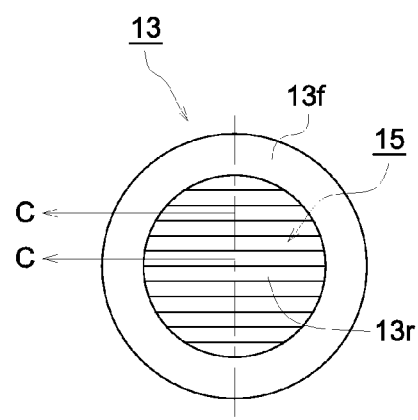
FIG. 3(a)
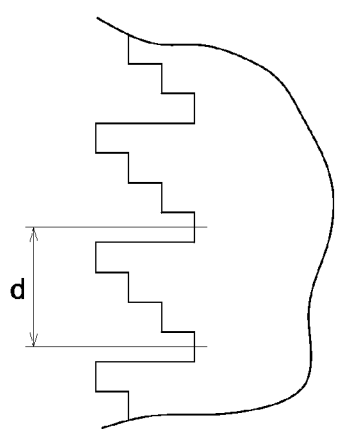
C-C CROSS SECTION
FIG. 3(b)

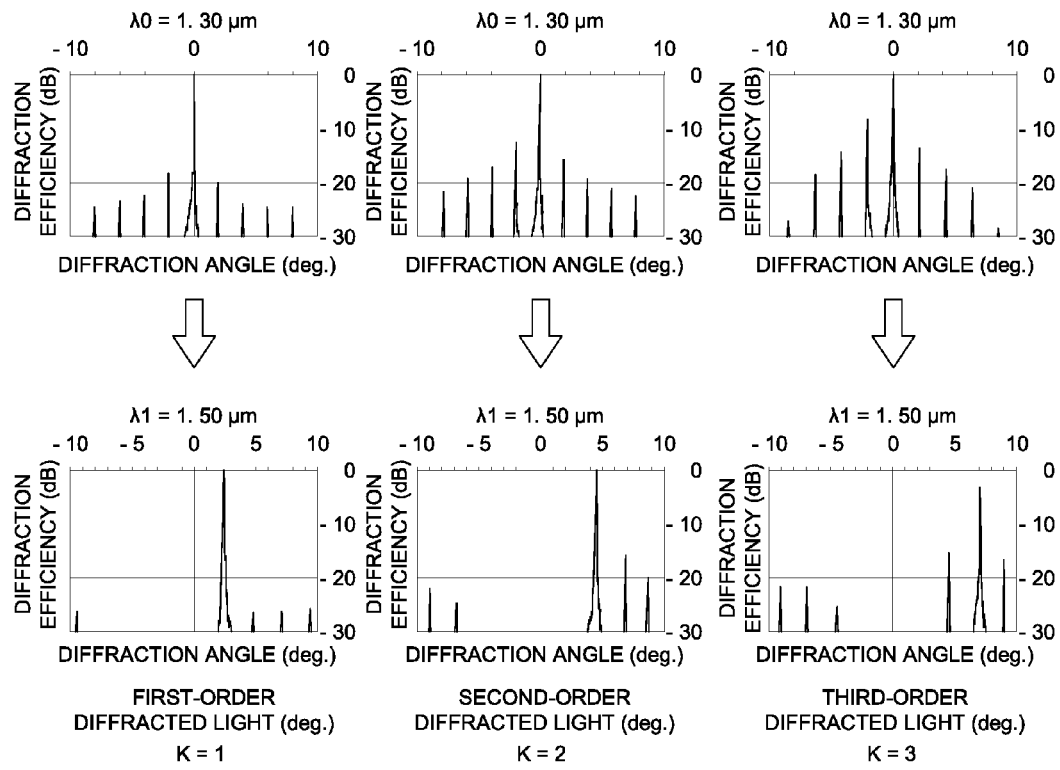
FIG. 6(a)  FIG. 6(b)  FIG. 6(c)
FIG. 7
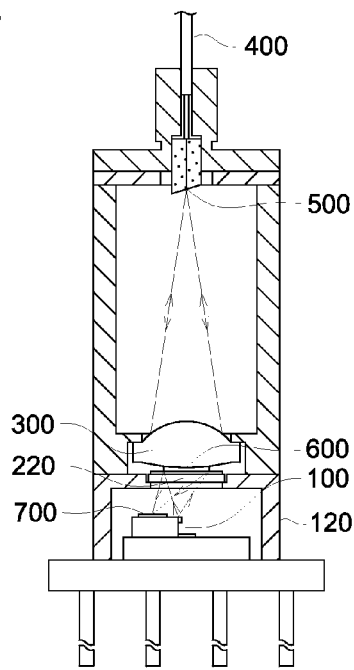

BI-DIRECTIONAL OPTICAL MODULE

This application is a U.S. National Phase Application under 35 U.S.C 371 of International Application PCT/JP2006/311196 filed Jun. 5, 2006.

TECHNICAL FIELD

The present invention relates to a bidirectional optical module that is used in a transmission terminal and a receiving terminal for bidirectional optical fiber communication by using a wavelength division multiplexing method.

BACKGROUND ART

An optical communication system employing an optical transmission line such as an optical fiber simultaneously transmits a plurality of optical signals each having a different wavelength with an optical fiber through WDM (wavelength division multiplexing). The optical communication system employs a bidirectional optical transmission module in a transmission terminal and a receiving terminal for optical signals. The bidirectional optical transmission module of this kind has become publicly known in, for example, the Patent Document 1: U.S Pat. No. 5,555,334. In the bidirectional optical transmission module described in the Patent Document 1, light-emitting element 100 and light-receiving element 700 are housed in same package 120 as shown in FIG. 7, and holographic diffraction grating 600 is provided on the upper or lower surface of cover glass 220 that is located at an opening of the package.

For transmitting signals to the bidirectional optical transmission module, a light beam emitted from light-emitting element 100 passes through the diffraction grating 600, and a $0^{th}$ order diffracted light beam is converged by lens 300 on surface 500 on an end of optical fiber 400. For receiving signals, a light beam emitted from the surface 500 on the end of optical fiber 400 arrives at diffraction grating 600 through lens 300. Then, the light beam is diffracted by the diffraction grating 600, and $+1^{st}$ order diffracted light beam is converged on a light detection surface of light-receiving element 700 so that transmitted signals transmitted through optical fiber 400 are received.

The diffraction grating 600 is constructed to be of a two-level grating in which linear grating grooves 200 are formed on a flat surface of cover glass 220 (refractive index: n), as shown in FIG. 8. However, if the two-level grating is used for the diffraction grating 600, respective dimensions of groove depth d, groove width W and pitch of groove P of the grating structure are uniquely determined on the maximum condition of the 1st diffracted light with wavelength $\lambda 1$ given by $\lambda 1/(2(n-1))$, resulting in a problem that it is difficult to improve diffraction efficiency of $0^{th}$ order diffracted light with another wavelength $\lambda 0$.

DISCLOSURE OF THE INVENTION

Problems to be Solved by the Invention

The present invention has been achieved in view of the aforesaid problems, and an object is to obtain an inexpensive bidirectional optical module wherein a diffraction efficiency can be maximized at different diffraction order number for light beam with different wavelength, and light usage efficiency is enhanced.

Means to Solve the Problems

The problems stated above can be solved by the following structures.

1) A bidirectional optical module for use in a bidirectional optical fiber communication with a wavelength division multiplexing method, the bidirectional optical module comprising: a light-emitting element for transmitting an optical signal toward an end of an optical fiber; a light-receiving element for receiving an optical signal from the end of the optical fiber; and a grating in which stair shapes are repeated with a predefined pitch, wherein a phase function is defined as phase-difference contour lines on a DOE plane arranged at a position of the grating, the phase-difference contour lines being formed by making two light fluxes interfere with each other, the two light fluxes being emitted from light-emitting elements each assumed to be arranged at a position of the end of the optical fiber and a position of the light-receiving element, and a planar pitch of the grating is formed such that values of the phase function form phase contour lines each representing an integer multiple of 360 degrees.

2) The bidirectional optical module of Item 1, wherein when the phase function is represented by a polynomial in x and y using x-y coordinates on a surface of the grating, the phase contour lines are provided by calculating coefficients up to a predetermined degree in each of x and y.

3) The bidirectional optical module of Item 1, wherein when the phase function is represented by a polynomial in x and y using x-y coordinates on a surface of the grating, the phase contour lines are provided by calculating coefficients in quadratic terms of each of x and y.

4) The bidirectional optical module of Item 1, wherein when the phase function is represented by a polynomial in x and y using x-y coordinates on a surface of the grating, the phase contour lines are provided by calculating coefficients in terms excluding x.

5) The bidirectional optical module of Item 1, wherein when the phase function is represented by a polynomial in x and y using x-y coordinates on a surface of the grating, the phase contour lines are provided by calculating coefficients in a primary term of y.

6) The bidirectional optical module of any one of Items 1 to 5, wherein the grating separates a first optical path between the end of the optical fiber and the light-emitting element, and a second optical path between the end of the optical fiber and the light-receiving element by using a difference in wavelengths of the optical signals.

7) The bidirectional optical module of Item 6, wherein one of the wavelengths of the optical signals corresponding to the first optical path is used for a 0th order diffracted light, and the other of the wavelengths of the optical signals corresponding to the second optical path is used for a first or higher order diffracted light.

8) The bidirectional optical module of any one of Items to 7, wherein each of steps in the stair-shaped grating has a step difference h satisfying a following expression.

$$h = K \cdot \{(M-1)/M\} \cdot \{\lambda 1/(n-1)\}$$

Where, M is a number of the steps in each of the stair shapes formed on the grating, $\lambda 1$ is a wavelength used for a fist or higher order diffracted light, n is a refractive index of a material forming the grating, and K is an integer.

9) The bidirectional optical module of Item 8, wherein the number M of steps in each of the stair shapes of the grating, is selected so as to hold a following expression.

$$h(n-1)/\lambda 0[=K\cdot\{(M-1)/M\}\cdot\{\lambda 1/\lambda 0\}]]=J$$

Where, $\lambda 0$ is a wavelength used for a 0th order diffracted light, and

J is an integer.

10) The bidirectional optical module of any one of Items 1 to 9, wherein the planar pitch of the grating is formed with irregular intervals.

11) The bidirectional optical module of any one of Items 1 or 4, wherein the grating comprises a straight-line with irregular interval structure.

12) The bidirectional optical module of any one of Items 1 to 3, wherein the grating comprises a curve with irregular interval structure.

EFFECTS OF THE INVENTION

The present invention makes it possible to obtain an inexpensive bidirectional optical module used for a transmission terminal and a receiving terminal for bidirectional optical fiber communication with the wavelength division multiplexing method wherein diffraction efficiency of a light beam having a different wavelength can be maximized at different diffraction order number and light usage efficiency is enhanced.

BRIEF DESCRIPTION OF DRAWINGS

FIG. 1 is a perspective view wherein a bidirectional optical module relating to the present embodiment is halved to show its inside.

FIG. 2 is a schematic sectional view of a bidirectional optical module relating to the present embodiment.

Each of FIGS. 3(a) and 3(b) is an outline schematic diagram showing an example of a grating form formed on a coupling lens.

Figure 4:
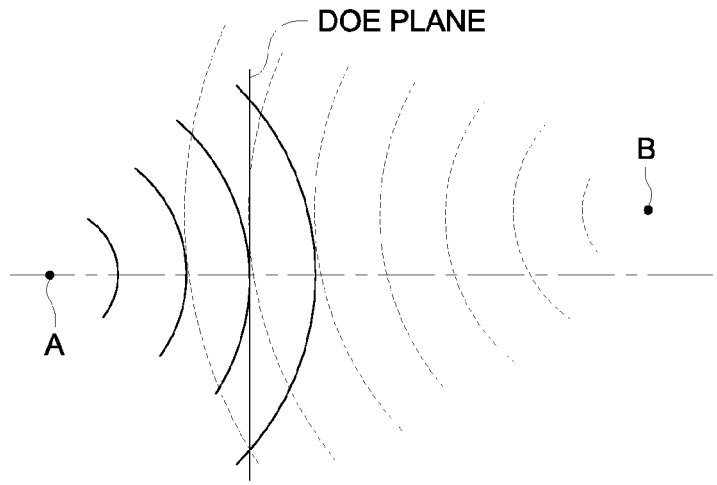
Figure 4:
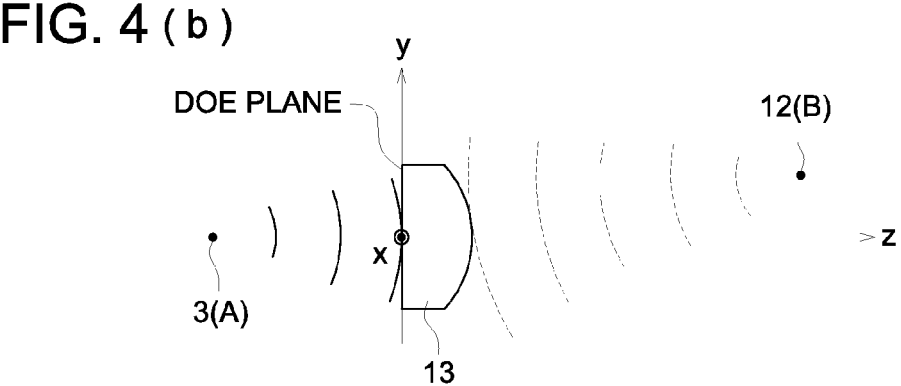

Each of FIGS. 4(a) and 4(b) is a schematic diagram for illustrating how to determine a pitch (planar pitch) for repeating a stair-shaped form formed on the grating.

Figure 5:
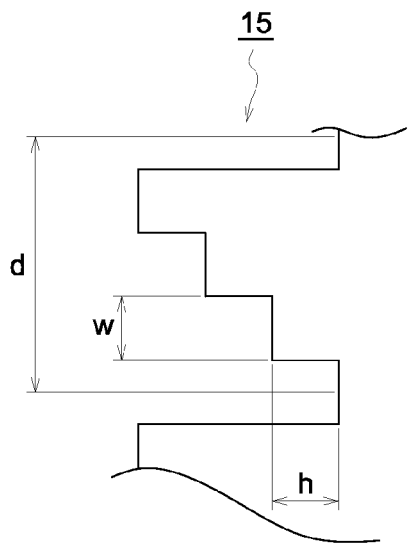

FIG. 5 is a diagram on which a stair-shaped portion of a grating is picked up.

Each of FIGS. 6(a) to 6(c) is a graph showing relationship between a diffraction angle and a diffraction efficiency for each of the occasions for K=1–3 satisfying expressions (2) and (3), for wavelength $\lambda 0$=1.3 μm, wavelength $\lambda 1$=1.5 μm, and n=1.5.

FIG. 7 is a sectional view of principal portions showing an example of a conventional bidirectional optical module.

Figure 8:
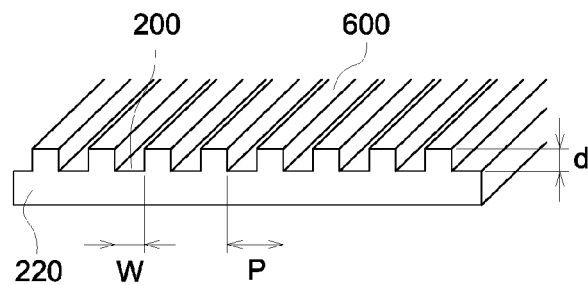

FIG. 8 is a perspective view of a two-level grating used for a conventional bidirectional optical module shown in FIG. 5.

Figure 9:
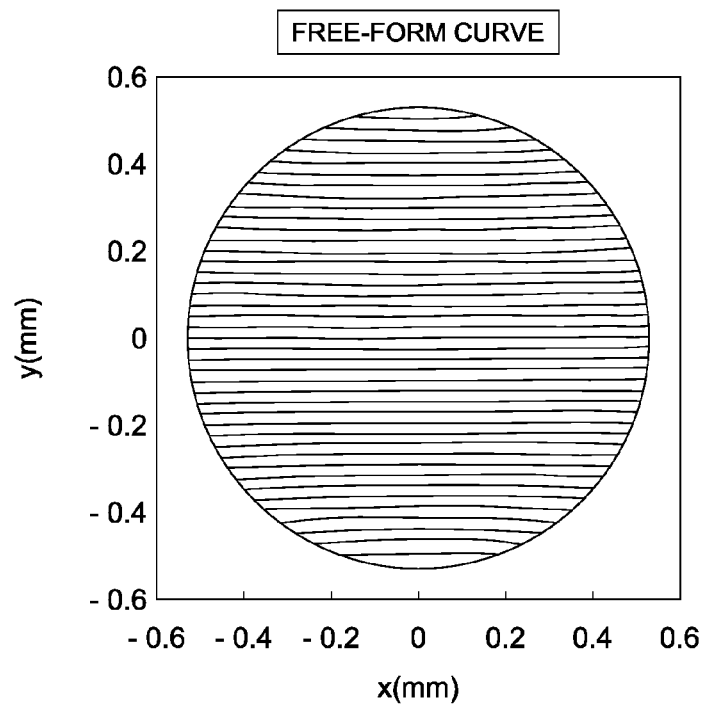
Figure 9:
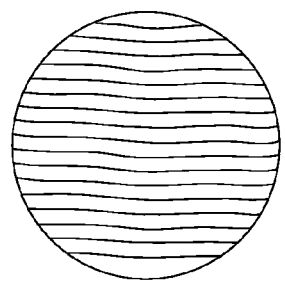

Each of FIGS. 9(a) and 9(b) is a diagram showing phase contour lines where a phase function value is an integer multiple of 360° based on results of Example 1.

Figure 10:
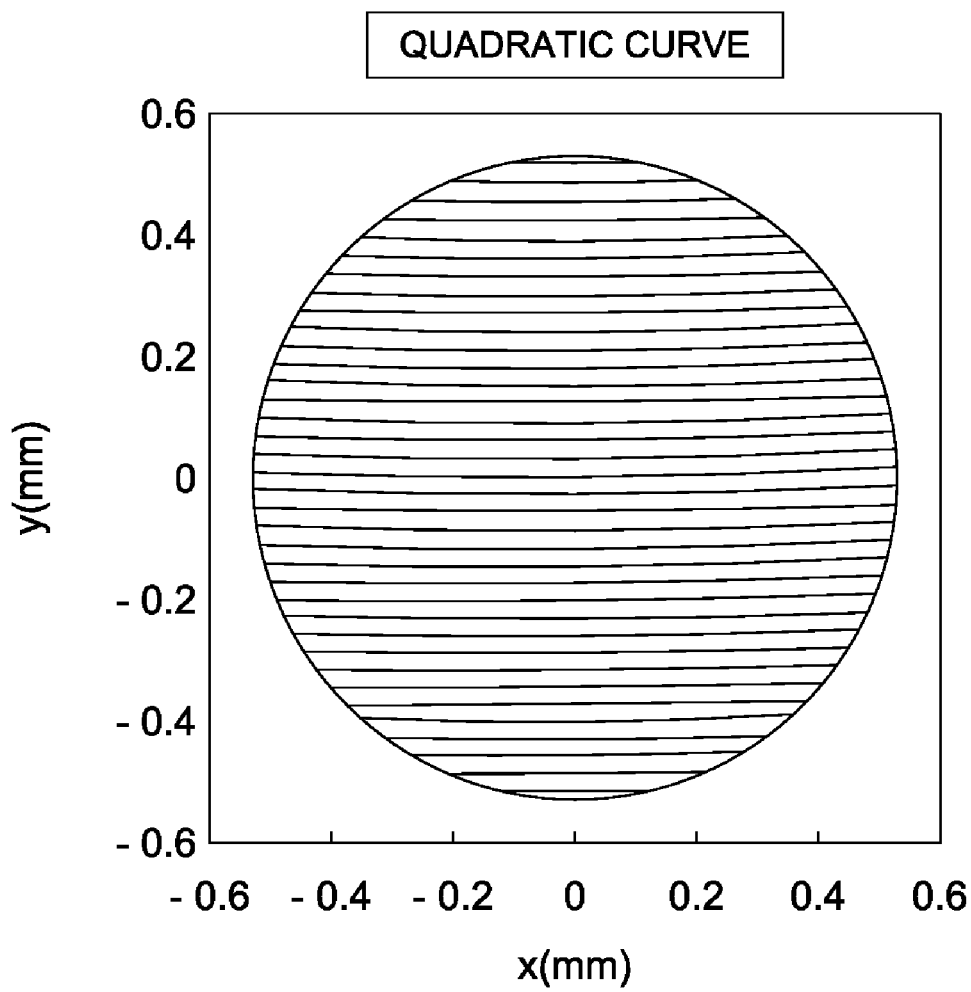
Figure 10:
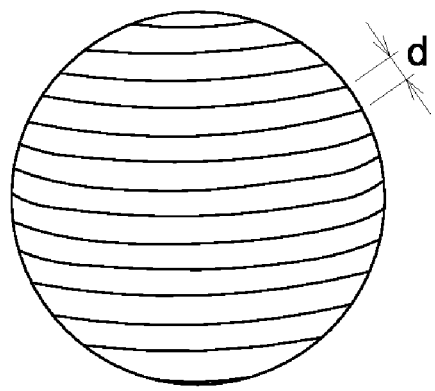

Each of FIGS. 10(a) and 10(b) is a diagram showing phase contours where a phase function value is an integer multiple of 360° based on results of Example 2.

Figure 11:
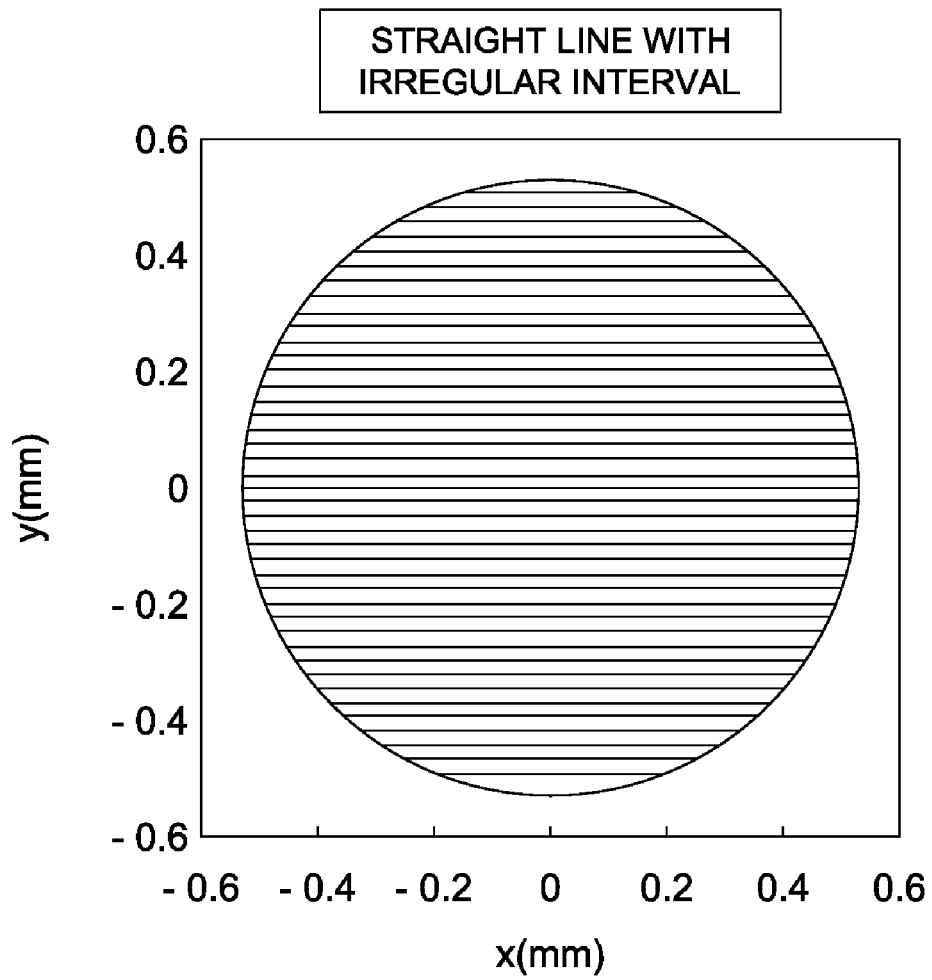
Figure 11:
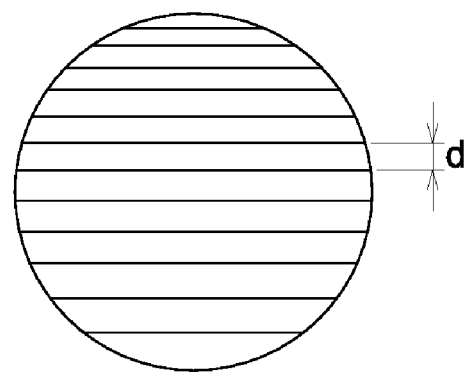

Each of FIGS. 11(a) and 11(b) is a diagram showing phase contours where a phase function value is an integer multiple of 360° based on results of Example 3.

Figure 12:
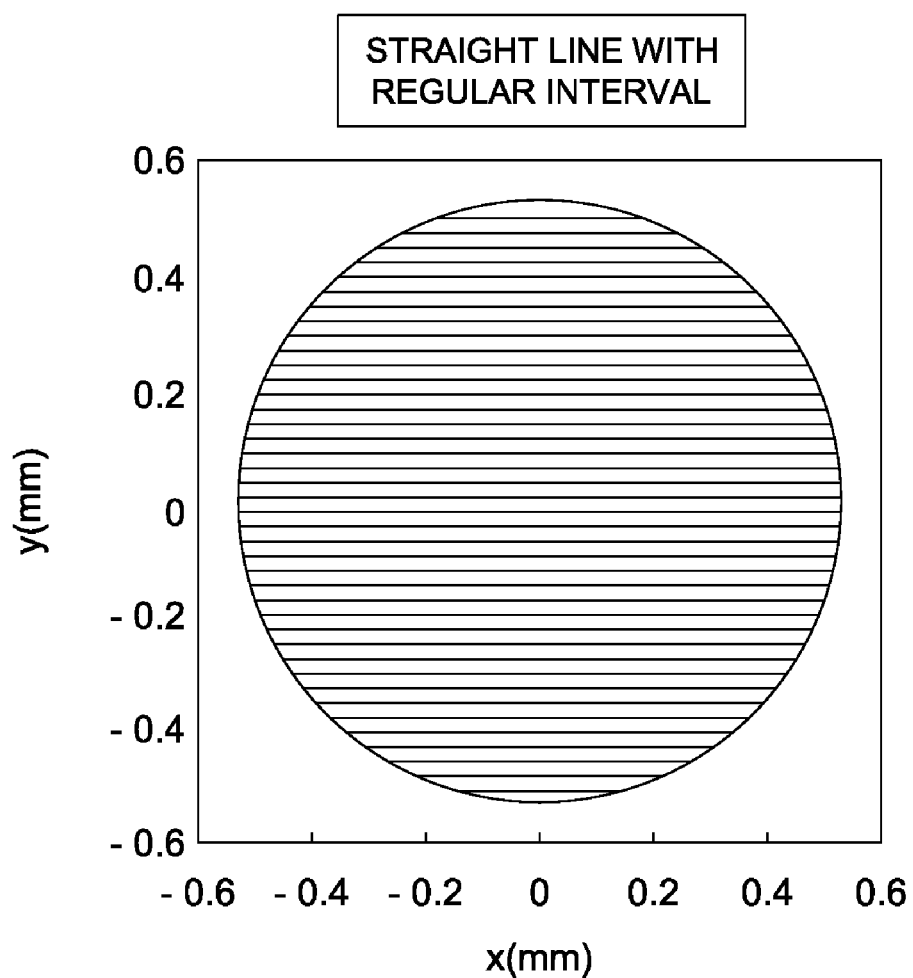
Figure 12:
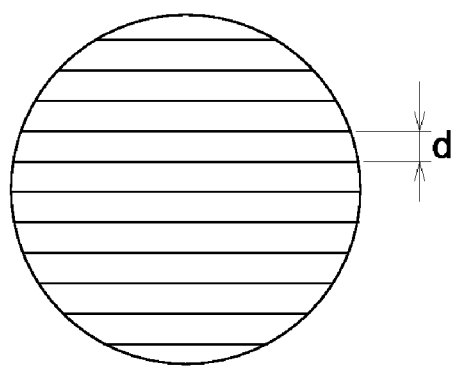

Each of FIGS. 12(a) and 12(b) is a diagram showing phase contours where a phase function value is an integer multiple of 360° based on results of Example 4.

BEST MODE FOR CARRYING OUT THE INVENTION

The invention will be explained as follows, referring to the embodiment to which, however, the invention is not limited.

FIG. 1 is a perspective view wherein a bidirectional optical module relating to the present embodiment is halved to show its inside.

FIG. 2 is a schematic sectional view of a bidirectional optical module relating to the present embodiment.

As shown in FIG. 1 and FIG. 2, bidirectional optical module 10 is equipped, in its casing 19 that is substantially in a cylindrical form, with light-emitting element 11, light-receiving element 12 and coupling lens 13. For example, laser diode (LD) is used for the light-emitting element 11 and photodiode (PD) is used for the light-receiving element 12. The light-emitting element 11 and the light-receiving element 12 are provided on common table 16, and the common table is fixed on the casing.

The light-emitting element 11 and the light-receiving element 12 are electrically connected to plural connection pins 17 protruded outward from the base table 16. These connection pins 17 are used for driving of the light-emitting element 11, driving of the light-receiving element 12 and for delivery of output of the light-receiving element 12 to an unillustrated equipment. Incidentally, the light-emitting element 11 and the light-receiving element 12 may also be provided on different base tables separately, and respective base tables may be fixed on the casing.

Fiber holder 2 supporting optical fiber 1 is inserted in casing 19 to be fixed, and surface 3 on an end of the optical fiber 1 is exposed to cavity 14 formed inside the casing 19. The optical fiber 1 is connected to an optical transmission line such as an outer optical fiber, for bidirectional optical fiber communication with a wavelength division multiplexing method.

Coupling lens 13 is arranged between surface 3 of an end portion of optical fiber 1 and a group of light-emitting element 11 and light-receiving element 12 in casing 19. This coupling lens 13 includes a surface facing the surface 3 of an end portion of optical fiber 1 where a grating is formed thereon, and a surface that faces the light-emitting element 11 and the light-receiving element 12 where a lens surface representing an aspheric surface is formed thereon.

Each of FIGS. 3(a) and 3(b) is an outline schematic diagram showing an example of a grating form formed on a coupling lens 13. FIG. 3(a) is a plan view wherein coupling lens 13 is viewed from the surface 3 side on the end of optical fiber 1, and FIG. 3(b) is a diagram showing a schematic sectional view of a grating section on which a section taken on line C-C shown in FIG. 3(a) is enlarged.

As shown in FIG. 3(a), grating 15 is formed to be in a stripe shape on optical effective surface 13r of the coupling lens 13 on the optical fiber 1 side. As shown in FIG. 3(b), a section of grating 15 is formed to be in a shape where stair shapes are repeated. Incidentally, 13f represents a flange portion of the coupling lens.

The coupling lens 13 is fixed in casing 19 in a way that a line connecting between light-emitting element 11 and light-receiving element 12 shown in FIG. 2 may positionally agree substantially with a one-dot chain line shown in FIG. 3(a).

Due to the structure stated above, as shown in FIG. 2, a light beam emitted from the light-emitting element 11 follows optical path b0 shown in FIG. 2, then passes through the lens surface and grating 15 of the coupling lens 13, and is converged on surface 3 on an end of optical fiber 1 as a diffracted light of $0^{th}$ order to enter, thus, the light beam can be delivered to an outer optical transmission line.

On the other hand, the light beam delivered from the outer optical transmission line and emitted from the surface 3 on the end of optical fiber 1 is diffracted by grating 15. The prescribed (for example $1^{st}$ order) diffracted light thus is converged by a lens surface of the coupling lens 13 and is deflected in the direction of optical path b1 shown in FIG. 2 to enter light-receiving element 12.

Incidentally, wavelength λ0 of a light beam emitted from light-emitting element 11 for transmission is, for example, 1.3 μm, while, wavelength λ1 of a light beam transmitted from an outer optical transmission line and received by light-receiving element 12 (reception) is, for example, 1.5 μm, which means the aforesaid light beams are different in terms of a wavelength.

The bidirectional optical module relating to the present embodiment is constructed as stated above.

The structure of the aforesaid grating 15 will be explained in detail, as follows.

First, a pitch relating to repetition of a stair shape formed on grating 15 will be explained. The pitch of repetition of a stair shape is an amount shown with d in FIG. 3(b), and it will be called a planar pitch hereafter for the explanation.

Each of FIGS. 4(a) and 4(b) is a schematic diagram for illustrating how to determine a pitch (planar pitch) of a repetition in stair shapes formed on grating 15. FIG. 4(a) is a schematic diagram for illustrating a way of thinking for obtaining a phase function, and FIG. 4(b) is a schematic diagram in the case of applying the way to the present embodiment.

As shown in FIG. 4(a), let it be assumed that a surface where a grating is arranged is DOE (Diffractive Optical Element) plane, and that a light-emitting element is provided at each of position A where light is emitted and position B where a light-receiving section is provided. A phase function given as phase difference contour lines is calculated, by assuming that light with predetermined wavelength (λ1 in the present example) is emitted from the each assumed light-emitting element, and by plotting the points where the phase differences on DOE plane are same to each other when making these two light fluxes interfere with each other. Then, an amount of a planar pitch of the grating is determined so that values of the phase function may form phase contour lines each representing an integer multiple of 360°. This amount of planar pitch is divided as stated later to form a stair-shaped portion.

When applying the determination to bidirectional optical module 10 shown in FIGS. 1 and 2, the aforesaid phase function is calculated with including coupling lens 13 under the assumption that a surface of coupling lens 13 on the optical fiber side is a DOE plane as shown in FIG. 4(b), and that a light-emitting element is provided at the position of A shown in FIG. 4(a) where the surface 3 on the end of the optical fiber was arranged, and a light-emitting element is provided at the position of B shown in FIG. 4(a) where the light-receiving surface of the light-receiving element 12 was arranged.

When the DOE plane is x-y plane, phase function (implicit function) is shown by the following expressions (when using terms of up to $10^{th}$ degree in each of x and y).

$$\theta = f(x, y)$$
$$= (C1x + C2y + C3x^2 + C4xy + C5y^2 + C6x^3 + C7x^2y + C8xy^2 +$$
$$C9y^3 + C10x^4 + C11x^3y + C12x^2y^2 + C13xy^3 + C14y^4 +$$
$$C15x^5 + C16x^4y + \ldots + \ldots + C55x^{10} + C56x^9y + \ldots +$$
$$C64xy^9 + C65y^{10}) \cdot 360/\lambda 1$$
$$= 360n$$

In the aforesaid expression, n represents an integer and a unit of each of x and y is mm.

By obtaining values of coefficients C1-Cm which hold for respective "n" from the phase function, it is possible to determine the phase function. Further, by obtaining the phase function values, it is possible to obtain a phase-difference contour lines formed by plotting points having the same phase difference on DOE plane, thus, planar pitch d of the grating whose phase function has values of integer multiple of 360° can be obtained.

Namely, the planar pitch d of the grating of the bidirectional optical module relating to the present embodiment is determined so that values of the phase function become phase contour lines each representing an integer multiple of 360° under the condition that two wavefronts emitted from two virtually arranged light-emitting elements interfere with each other.

Next, a stair-shaped portion that is formed on grating 15 with the aforesaid planar pitch d will be explained.

FIG. 5 is a diagram on which a stair-shaped portion of a grating 15 is picked up.

It is preferable that step difference h of each step and number of steps M in a stair shape shown in FIG. 5 are formed to hold the following expressions (2) and (3).

$$h = K \cdot ((M-1)/M) \cdot (\lambda 1/(n-1)) \quad (2)$$

$$h(n-1)/\lambda 0 = J \quad (3)$$

In the aforesaid expressions, n represents a refractive index of a material forming the grating and K and J represent an integer. Incidentally, the number of steps is 4 in FIG. 5.

Each of FIGS. 6(a) to 6(c) is a graph showing relationship between a diffraction angle and a diffraction efficiency for each of the occasions for K=1–3 satisfying expressions (2) and (3), for wavelength λ0=1.3 μm, wavelength λ1=1.5 μm, and n=1.5. FIG. 6(a) shows an occasion for K=1, M=8 and h=2.62 μm, FIG. 6(b) shows an occasion for K=2, M=8 and h=5.24 μm and FIG.6(c) shows an occasion for K=3, M=8 and h=7.86 μm.

As shown in FIG. 6(a), in the case of K=1, diffracted light of $0^{th}$ order has the maximum diffraction efficiency in light with wavelength 1.3 μm, and diffracted light of $1^{st}$ order has the maximum diffraction efficiency in light with wavelength 1.5 μm. Further, as shown in FIG. 6(b), in the case of K=2, diffracted light of $0^{th}$ order has the maximum diffraction efficiency in light with wavelength 1.3 μm and diffracted light of $2^{nd}$ order has the maximum diffraction efficiency in light with wavelength 1.5 μm. Further, as shown in FIG. 6(c), in the case of K=3, diffracted light of $0^{th}$ order has the maximum diffraction efficiency in light with wavelength 1.3 μm and diffracted light of $3^{rd}$ order has the maximum diffraction efficiency in light with wavelength 1.5 μm.

Incidentally, the diffraction order number that makes the efficiency maximum, namely, the value of integer K may be 4 or more, but it is preferable to make it 3 or less that can maintain the higher diffraction efficiency.

Namely, by forming the stair shape with step difference h and the number of steps M both satisfying the aforesaid expressions (2) and (3), it is possible to keep the diffraction efficiency of the diffracted light of $0^{th}$ order with wavelength $\lambda 1$ to be the maximum, while maintaining the diffraction efficiency of a diffracted light with wavelength $\lambda 1$ of the desired first or higher diffraction order to be the maximum.

As explained above, it is assumed that a DOE plane is positioned at the position of the grating, and that light-emitting elements are provided at a position of an end of the optical fiber and at the position of the light-receiving element. Then, a phase function is defined as phase-difference contour lines on the DOE plane formed by making two light fluxes of these assumed light-emitting elements interfere with each other. The planar pitch d of the grating is determined such that values of the phase function forms phase contour lines each representing an integer multiple of 360°. Further, a stair-shaped portion with step difference h by dividing the planar pitch d in M step portions is formed in a way to satisfy the aforesaid expressions (2) and (3). Thereby, it is possible to make a light beam with a wavelength $\lambda 0$ from a light-emitting element to enter efficiently the surface on the end portion of the optical fiber in the greatest efficiency as a diffracted light of $0^{th}$ order. Further, it is possible to cause a light beam with wavelength $\lambda 1$ emitted from the surface of the end portion of the optical fiber to be deflected in the direction based on the diffraction angle, and thereby to introduce the diffracted light of the desired order number with the greatest efficiency to the light-receiving element arranged at the position that is away from the optical axis of the coupling lens.

By forming a grating in which stair shape with step difference h and the number of steps M stated above is repeated with planar pitch d, it is possible to maximize diffraction efficiencies of respective light beams with different wavelengths with respective different diffraction order numbers, and to obtain an inexpensive bidirectional optical module whose utilization efficiency is enhanced.

Incidentally, for the aforesaid expression of phase function (1), it is also possible to calculate coefficients with approximating and simplifying as stated below.

For example, the coefficients can be calculated by defining the x-y coordinates on the surface of the grating, and by using terms of up to the predetermined number of degrees, for example, up to the $4^{th}$ degrees. Further, it is naturally possible that coefficients are calculated, with properly simplifying the calculations, only for quadratic terms in each of x and y, or only for terms excluding x, or only for the primary term of y.

EXAMPLES

The invention will further be explained about a planar pitch of the grating as follows, referring to the Example to which, however, the invention is not limited.

In the following calculation, the planar pitch was obtained under the assumption that the surface of the grating is located at the position of z=0 as shown in FIG. 4(b), $\lambda 1=1.56\times 10^{-3}$ mm, positions of the two light-emitting elements provided on a virtual basis are (0, −0.3014, −5.361) and (0, 0, 9.764) respectively in the x-y-z coordinates, and the coupling lens is a plane-convex lens whose thickness in the positive direction of z axis is 0.5 mm, and a paraxial radius of curvature is 1.8465 mm.

Example 1

A coefficient that holds for each "n"; in a phase function expressed by the aforesaid expression (1) was obtained. Examples of respective coefficients thus obtained are shown below.

C1: C2: $3.99573996016\times 10^{-2}$
C3: $-2.49469148046\times 10^{-5}$
C5: $-2.49468855604\times 10^{-5}$
C10: $-3.51010616246\times 10^{-4}$
C12: $-7.02115022462\times 10^{-4}$
C14: $-3.51011962062\times 10^{-4}$ In this case, the phase contour lines are free-form curves.

Each of FIGS. 9(a) and 9(b) is a diagram showing phase contour lines where a phase function value is an integer multiple of 360° based on results of Example 1. FIG. 9(a) is a figure drawn based on calculated values, and FIG. 9(b) is a schematic diagram wherein exaggerated brief overviews are shown. In this case, FIG. 9(b) shows free-form curves with irregular intervals of pitch.

Example 2

In the phase function indicated by the aforesaid expression (1), coefficients which hold for respective "n" were obtained under the condition that the phase function is $$\theta = f(x, y)$$
$$= C2y + C3x^2 + C5y^2 + C12x^2y^2 \cdot 360/\lambda 1$$
$$= 360n$$

wherein n represents an integer and a unit of each of x and y is mm, using only quadratic terms in each of x and y except for C2. The coefficients thus obtained are as follows.

C2: $-5.9155\times 10^{-2}$
C3: $1.2534\times 10^{-3}$
C5: $1.6547\times 10^{-3}$
C12: $-1.9093\times 10^{-3}$ In this case, the phase contour lines form quadratic curves.

Each of FIGS. 10(a) and 10(b) is a diagram showing a phase contours where a phase function value is an integer multiple of 360° based on results of Example 2. FIG. 10(a) is a figure drawn based on calculated values, and FIG. 10(b) is a schematic diagram wherein exaggerated brief overviews are shown. In this case, FIG. 10(b) shows quadratic curves with irregular intervals of pitch d.

Example 3

In the phase function indicated by the aforesaid expression (1), coefficients which hold for respective "n" were obtained under the condition that the phase function is $$\theta = f(x, y)$$
$$= (C2y + C5y^2 + C9y^3 + C14y^4 + \ldots + C65y^{10}) \cdot 360/\lambda 1$$
$$= 360n$$

wherein n represents an integer and a unit of each of x and y is mm, using only terms excluding x. The coefficients thus obtained are as follows. Incidentally, C14 (quartic terms) and succeeding coefficients are omitted, because they are extremely small.

C2: $-5.9155\times 10^{-2}$
C5: $1.6212\times 10^{-3}$
C9: $6.8986\times 10^{-4}$ In this case, the phase contour lines form straight lines with irregular intervals.

Each of FIGS. 11(a) and 11(a) is a diagram showing phase contours where a phase function value is an integer multiple of 360° based on results of Example 3. FIG. 11(a) is a figure drawn based on calculated values, and FIG. 11(b) is a schematic diagram wherein exaggerated brief overviews are shown. In this case, FIG. 11(b) shows straight lines with irregular intervals of pitches d.

Example 4

In the phase function indicated by the aforesaid expression (1), coefficients which hold for respective "n" were obtained under the condition that the phase function is $$\theta = f(x, y)$$
$$= C2y \cdot 360/\lambda 1$$
$$= 360n$$

wherein n represents an integer and a unit of each of x and y is mm, using only the primary term in y. The coefficients thus obtained are as follows.
C2: $-5.824 \times 10^{-2}$ In this case, the phase contour lines form straight lines with irregular intervals.

Each of FIGS. 12(a) and 12(b) is a diagram showing phase contours where a phase function value is an integer multiple of 360° based on results of Example 4. FIG. 12(a) is a figure drawn based on calculated values, and FIG. 12(b) is a schematic diagram wherein exaggerated brief overviews are shown. In this case, FIG. 12(b) shows straight lines with regular intervals of pitch d.

Incidentally, for each n, the phase contour can be represented as an explicit function to be expressed by the following expression.

$$y_n = y0_n + y1_n x^2 + y2_n x^4 + y3_n x^6 + y4_n x^8 + \ldots$$

Then, when a stair shape with M steps shown in FIG. 5 is formed by the planar pitch thus obtained, and the number of diffraction order of the diffracted light to be used is made to be $0^{th}$ order and $1^{st}$ order, it is possible to design as follows.
Planar pitch d: 26 μm (in the case of Example 4)
Number of steps M: Natural number of two or more, satisfying the following expressions (4) and (5)
Step width W: W=d/M where d=λ1/sin θ (θ is the first order diffraction angle)

All the number of steps M and step difference h comply with the same rule. Namely, the number of steps M and step difference h which satisfy both expressions (4) and (5) are obtained under the condition that λ0 represents a wavelength for which the diffracted light of $0^{th}$ order is used and λ1 represents a wavelength for which the diffracted light of $1^{st}$ order is used.

$$h = J\lambda 0/(n-1) \quad (4)$$

$$J\lambda 0 = \lambda 1 K(M-1)/M \quad (5)$$

In the expressions above, each of J, K and M is a natural number.

When λ0 is 1.31 μm, λ1 is 1.5 μm and n is 1.5 in the aforesaid expressions, the expressions (4) and (5) are satisfied by K=1, J=1, h=2.62 μm and M=8.

When the grating is formed with planar pitch d shown in the aforesaid Examples 1-4, a size of a form of a spot converged on a light-receiving element is the smallest in the case of Example 1, and the size grows greater in the order of Example 2, Example 3 and Example 4. However, the largest size in the examples is 30 μm, and they do not cause a problem by employing a light-receiving element having a light-receiving portion that is greater than the calculated spot diameter, corresponding properly to the spot diameter.

Further, in the case of the aforesaid Examples 3 and 4, namely, in the case of the linear structures shown in FIGS. 11(a) and 11(a), 12(a) and 12(b) fly cutting is possible, which is preferable. Incidentally, for manufacturing of the coupling lens on which the grating is formed, a glass mold can be used for manufacturing when a material is glass, and molding can be used for manufacturing when a material is resin.

Incidentally, in the aforesaid embodiments, the explanations have been given with an example wherein the grating is formed on one side of the coupling lens. However, the invention is not limited to this, and it is also possible to employ the separated structure including a member where the grating is formed and a lens. In this case, the member where the grating is formed is made to be a DOE plane, and phase-difference contour formed by plotting points representing the same phase difference on the DOE plane can be obtained under the condition that the member where the grating is formed and the lens are arranged virtually, based on its actual arrangement. Further, the surface on which the grating is formed may naturally be a curved surface.

The invention claimed is:

1. A bidirectional optical module for use in a bidirectional optical fiber communication with a wavelength division multiplexing method, the bidirectional optical module comprising:
    a light-emitting element for transmitting an optical signal toward an end of an optical fiber;
    a light-receiving element for receiving an optical signal from the end of the optical fiber; and
    a grating in which stair shapes are repeated with a predefined pitch,
    wherein a phase function of the grating is defined as phase-difference contour lines on a DOE plane arranged at a position of the grating, the phase-difference contour lines being formed by making two light fluxes interfere with each other, the two light fluxes being emitted from light-emitting elements each assumed to be arranged at a position of the end of the optical fiber and a position of the light-receiving element, and
    a planar pitch of the grating is formed such that values of the phase function form phase contour lines each representing an integer multiple of 360 degrees.

2. The bidirectional optical module of claim 1,
    wherein the phase function is represented by a polynomial in x and y using x-y coordinates on a surface of the grating, and the phase contour lines are provided by calculating coefficients of the polynomial in the terms of up to a predetermined degree in each of x and y.

3. The bidirectional optical module of claim 1,
    wherein the phase function is represented by a polynomial in x and y using x-y coordinates on a surface of the grating, and the phase contour lines are provided by calculating coefficients in quadratic terms of each of x and y of the polynomial.

4. The bidirectional optical module of claim 1,
    wherein the phase function is represented by a polynomial in x and y using x-y coordinates on a surface of the grating, and the phase contour lines are provided by calculating coefficients in terms excluding x of the polynomial.

5. The bidirectional optical module of claim 1,
wherein the phase function is represented by a polynomial in x and y using x-y coordinates on a surface of the grating, and the phase contour lines are provided by calculating coefficients in a primary term of y of the polynomial.

6. The bidirectional optical module of claim 1,
wherein the grating separates a first optical path between the end of the optical fiber and the light-emitting element, and a second optical path between the end of the optical fiber and the light-receiving element by using a difference in wavelengths of the optical signal transmitted toward the end of the optical fiber and the optical signal received by the end of the optical fiber.

7. The bidirectional optical module of claim 6,
wherein the grating separates the first optical path and the second optical path by using one of the wavelengths corresponding to the first optical path for a 0th order diffracted light, and
the other of the wavelengths corresponding to the second optical path for a first or higher order diffracted light.

8. The bidirectional optical module of claim 1,
wherein each of steps in the grating has a step difference h satisfying a following expression:

$$h = K \cdot \{(M-1)/M\} \cdot \{\lambda 1/(n-1)\},$$

where M is a number of the steps in each of the stair shapes formed on the grating, $\lambda 1$ is a wavelength used for a fist or higher order diffracted light, n is a refractive index of a material forming the grating, and K is an integer.

9. The bidirectional optical module of claim 8,
wherein the number M of steps in each of the stair shapes of the grating is selected so as to hold a following expression:

$$h(n-1)/\lambda 0 [ \equiv K \cdot \{(M-1)/M\} \cdot \{\lambda 1/\lambda 0\}]] = J,$$

where $\lambda 0$ is a wavelength used for a 0th order diffracted light, and

J is an integer.

10. The bidirectional optical module of claim 1,
wherein the planar pitch of the grating is formed such that the phase contour lines are formed with irregular intervals.

11. The bidirectional optical module of claim 1,
wherein the planar pitched of the grating is formed such that the phase contour lines forms a straight lines with irregular intervals.

12. The bidirectional optical module of claim 1,
wherein the planar pitched of the grating is formed such that the phase contour lines forms curves with irregular intervals.

* * * * *